United States Patent
Zhang et al.

(10) Patent No.: US 12,469,907 B2
(45) Date of Patent: Nov. 11, 2025

(54) INSULATING SHEET OF CYLINDRICAL BATTERY, METHOD FOR ASSEMBLING ROLL CORE AND SHELL, AND CYLINDRICAL BATTERY

(71) Applicant: LINKDATA NEW ENERGY CO., LTD., Wuxi (CN)

(72) Inventors: Xiaoyun Zhang, Wuxi (CN); Xiaxia Liao, Wuxi (CN); Sitao Yang, Wuxi (CN); Jun Wu, Wuxi (CN)

(73) Assignee: LINKDATA NEW ENERGY CO., LTD., Wuxi (CN)

( * ) Notice: Subject to any disclaimer, the term of this patent is extended or adjusted under 35 U.S.C. 154(b) by 890 days.

(21) Appl. No.: 17/546,781

(22) Filed: Dec. 9, 2021

(65) Prior Publication Data

US 2022/0102794 A1 Mar. 31, 2022

Related U.S. Application Data

(63) Continuation of application No. PCT/CN2020/130547, filed on Nov. 20, 2020.

(30) Foreign Application Priority Data

May 18, 2020 (CN) .......................... 202010418618.5

(51) Int. Cl.
*H01M 50/152* (2021.01)
*H01M 10/0587* (2010.01)
(Continued)

(52) U.S. Cl.
CPC ..... *H01M 50/152* (2021.01); *H01M 10/0587* (2013.01); *H01M 50/107* (2021.01); *H01M 50/533* (2021.01); *H01M 10/0525* (2013.01)

(58) Field of Classification Search
CPC ........... H01M 50/152; H01M 10/0587; H01M 10/0525; H01M 50/107; H01M 50/154
See application file for complete search history.

(56) References Cited

U.S. PATENT DOCUMENTS

2005/0014064 A1* 1/2005 Matsubara .......... H01M 50/562
429/180
2009/0214952 A1* 8/2009 Wakita .................. H01M 4/587
429/213

FOREIGN PATENT DOCUMENTS

CN 101604737 A 12/2009
CN 101651187 A 2/2010
(Continued)

OTHER PUBLICATIONS

Merriam Webster, "Eccentric", 2024, https://www.merriam-webster.com/dictionary/eccentric (Year: 2024).*

(Continued)

*Primary Examiner* — Nicholas A Smith
*Assistant Examiner* — Ziheng Lu

(57) ABSTRACT

The present application discloses an insulating sheet of a cylindrical battery, including an insulating sheet body. A tab through hole or a tab notch is formed in the insulating sheet body, the tab through hole or the tab notch is arranged to be eccentric. The insulating sheet of the cylindrical battery further includes a blind hole or a through hole formed in a middle portion of the insulating sheet body, and further includes a metal sheet. The metal sheet covers on an opening at an end of the blind hole or the through hole and/or is arranged in the blind hole or the through hole. A surface of the metal sheet protrudes or is flush with the opening of the blind hole or the through hole, and a thickness of the metal sheet in the through hole is smaller than a depth of the through hole.

3 Claims, 3 Drawing Sheets

(51) Int. Cl.
*H01M 50/107* (2021.01)
*H01M 50/533* (2021.01)
*H01M 10/0525* (2010.01)

(56) References Cited

FOREIGN PATENT DOCUMENTS

| CN | 108922995 A | 11/2018 |
|----|-------------|---------|
| CN | 110497082 A | 11/2019 |
| CN | 111430593 A | 7/2020 |
| CN | 211907494 U | 11/2020 |
| KR | 20000014999 A | 3/2000 |
| KR | 20000019348 A | 4/2000 |
| KR | 20170053394 A | 5/2017 |
| WO | WO2014137633 A1 | 9/2014 |

OTHER PUBLICATIONS

CN101651187A Machine Translation (Year: 2010).*
The First Office Action dated Mar. 23, 2023 for Chinese Application No. 202010418618.5.
The Second Office Action dated Jan. 15, 2024 for Chinese Application No. 202010418618.5.
Office Action dated Feb. 24, 2022 from German Patent and Trademark Office for Application No. 21 2020 000 677.6.
International Search Report dated Feb. 20, 2021 for International Application No. PCT/CN2020/130547.

* cited by examiner

INSULATING SHEET OF CYLINDRICAL BATTERY, METHOD FOR ASSEMBLING ROLL CORE AND SHELL, AND CYLINDRICAL BATTERY

CROSS REFERENCE TO RELATED APPLICATION

The present application is a continuation of International Application No. PCT/CN2020/130547, filed on Nov. 20, 2020, which claims priority to Chinese Patent Application No. 202010418618.5, filed on May 18, 2020, both of which are hereby incorporated by reference in their entireties.

TECHNICAL FIELD

The present application relates to a technical filed of lithium ion battery, and specifically relates to an insulating sheet of a cylindrical battery, a method for assembling a roll core and a shell and the cylindrical battery.

BACKGROUND

An insulating sheet of a cylindrical battery is arranged between a battery shell and an end of a roll core to isolate a battery tab and the roll core, so that it can helps to improve the safety of the battery. A basic structure of the insulating sheet includes: a tab through hole or an edge tab notch through which a tab can pass is formed in a circular sheet made of insulating material, and a through hole is formed in a middle portion of the insulating sheet.

There are generally two ways to assemble the tab and the battery shell: one is an internal electric-resistance welding; the other is an external laser welding.

An operation process of the internal electric-resistance welding is that: the tab passes through the tab through hole or the edge tab notch in the insulating sheet of the cylindrical battery, the tab is folded to cover the through hole in the middle portion of the insulating sheet, a welding head of an electric-resistance welding device passes through a center hole of the roll core, and the tab is pressed tightly on an inner surface of an end face of the battery shell and welded. The defect of the internal electric-resistance welding is that: the welding slag and dust are generated during the welding process, and the risk of short circuit of a battery core will be greatly increased if the welding slag and dust enter the roll core.

The external laser welding has been described in CN110497082A. A pressure plate passes through the center hole of the roll core, and presses and fits the tab with the inner surface of the end face of the battery shell, a laser beam of a laser welding equipment irradiates near a center of an outer surface of the end face of the battery shell, and the battery shell is partially melted and welded with the tab to integrate together. The benefit of the external laser welding is to avoid defects such as the welding slag caused by the internal electric-resistance welding and the like, and reduce the risk of the short circuit of the battery core. However, due to a thin body of the tab, the tab and an outer end face of the battery are prone to problems such as the weak welding and the false welding.

SUMMARY

One object of the present application is to overcome the defects in the prior art and provide an insulating sheet of a cylindrical battery, in which a metal sheet of the insulating sheet is conducive to increasing a weldable thickness of a tab and an end face of a battery shell when welding.

In order to achieve the above technical effects, the technical solution of the present application is: an insulating sheet of a cylindrical battery including an insulating sheet body, in which a tab through hole or a tab notch is formed in the insulating sheet body, the tab through hole or the tab notch is eccentric; the insulating sheet of the cylindrical battery further includes a blind hole or a through hole formed in a middle portion of the insulating sheet body, and further includes a metal sheet; the metal sheet covers on an opening at an end of the blind hole or the through hole and/or is arranged in the blind hole or the through hole.

A surface of the metal sheet protrudes or is flush with the opening of the blind hole or the through hole, and a thickness of the metal sheet in the through hole is smaller than a depth of the through hole; or a thickness of the metal sheet movably arranged in the through hole is smaller than a thickness of the insulating sheet body.

In some embodiments, the through hole is a stepped through hole, the stepped through hole comprises a large aperture segment and a small aperture segment, and the metal sheet is arranged in the large aperture segment.

In some embodiments, the metal sheet includes an embedded portion and a convex portion arranged at an edge of a center portion, the embedded portion is arranged in the through hole, and the convex portion is attached to or connected to a surface of the insulating sheet body.

In some embodiments, the metal sheet and the insulating sheet body are arranged concentrically.

In some embodiments, the metal sheet is fixedly connected to the insulating sheet body.

Another object of the present application is to provide a method for assembling a roll core and a shell, applying to the insulating sheet of the cylindrical battery as described above, including the following steps:

S1, passing and arranging a tab of the roll core into the tab through hole or the tab notch of the insulating sheet of the cylindrical battery;

S2: bending a tab segment protruding from the tab through hole or the tab notch until the bent tab segment is adjacent to or attached to the metal sheet to obtain an assembling body of the roll core and the insulating sheet of the cylindrical battery;

S3: assembling the assembling body into the battery shell;

S4: inserting a center rod into a center hole of the roll core, wherein the center rod is toppedly connected to an end face of the battery shell, the bent tab segment and the metal sheet; and S5: performing a laser welding at an outside of a middle portion of an end face of the battery shell to connect the end face of the battery shell, the bent tab segment and the metal sheet.

Another object of the present application is to provide the cylindrical battery, including a battery shell and a roll core, further including the insulating sheet of the cylindrical battery as described above. An end face of the battery shell, a tab of the roll core and the metal sheet of the insulating sheet of the cylindrical battery are connected by welding.

The advantages and the beneficial effects of the present application are that:

the insulating sheet of the cylindrical battery includes an insulating sheet body and an electric-conductive sheet; the electric-conductive sheet protrudes or is flush on the surface of the insulating sheet body, or the electric-conductive sheet is movably arranged in the through hole of the insulating sheet body; each of the two types of the electric-conductive sheets can be in contact with or toppedly connected with the tab during the external laser welding operation, that is the tab is located between and is fully in contact with the end face of the battery shell and the metal sheet, so as to increase a thickness of the material to be welded; a welding structure between an end face of the battery shell and the tab is stable, which can effectively improve the safety performance of the battery.

Figure 1:
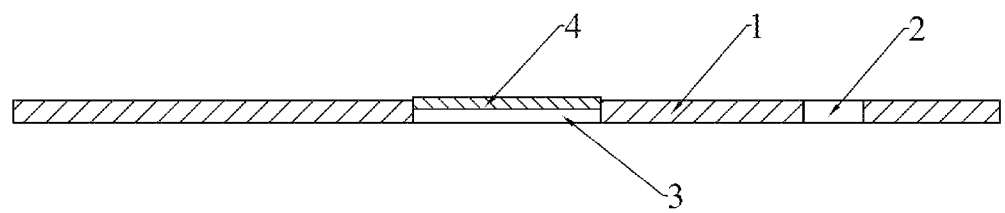
FIG. 1 shows a structural schematic view of an insulating sheet of a cylindrical battery in Example 1.

In the drawings:
1—insulating sheet body; 2—tab through hole; 3—through hole; 31—large aperture segment; 32—small aperture segment; 4—metal sheet; 41—embedded portion; 42—convex tab; 5—blind hole; 6—tab notch; 7—tab; 8—roll core; 9—battery shell; 10—center rod.

DETAILED DESCRIPTION

The specific embodiments of the present application will be further described below in conjunction with the drawings and the examples. The following examples are only used to illustrate the technical solutions of the present application more clearly, and cannot be used to limit the protection scope of the present application.

A insulating sheet of a cylindrical battery is arranged between an end face of a battery shell and a roll core, that is, one surface of the insulating sheet of the cylindrical battery is adjacent to an end face of the roll core, the other surface of the insulating sheet of the cylindrical battery is adjacent to the end face of the battery shell, and a bent tab of the roll core is located between the other surface and the end face of the battery shell. The shape of the insulating sheet of the cylindrical battery, a tab through hole or a tab notch are all known technologies. The common insulating sheet of the cylindrical battery is circular. The shape of the tab through hole includes but is not limited to a rectangle and an arc. The tab notch is formed at an edge of the insulation sheet of the cylindrical battery. The shape of the tab notch includes but is not limited to a round notch shape, which only needs to meet the using requirements for passing by the tab. A passing direction of the tab is from a side adjacent to the roll core of the insulating sheet of the cylindrical battery to a side adjacent to the battery shell.

The connection relationship between a metal sheet and an insulating sheet body can be a fixed connection or bonding (including an easy-peel bonding with weak adhesion), or can be separated parts of the two. In the solution of the separated parts of the two, the insulating sheet body and a through hole or a blind holes therein serve to meet the requirements of the assembly and positioning of the metal sheet during a process that the tab passes through the insulation sheet of the cylindrical battery, the tab is bent, and a assembling body of the roll core and the insulating sheet assembling body (an assembling body of the roll core and the insulation sheet of the cylindrical battery) is installed into the battery shell.

Setting the through hole as a stepped through hole, or setting a face of the metal sheet to be matched with the blind hole or an opening of the through hole into a stepped surface including an embedded portion and a convex portion, both of the settings can be conducive to positioning the metal sheet.

The metal sheet is fixedly connected to the insulating sheet body. In some embodiments, the metal sheet is fixedly arranged in the blind hole, and the metal sheet and the roll core are sufficiently isolated by the insulating sheet body therebetween, and the position of the metal sheet during the assembly process of the roll core and the battery shell can be ensured to be unmovable.

When all or part of the metal sheet is located in the through hole, a surface of the metal sheet protrudes or is flush with the opening of the blind hole or the through hole. A thickness of the metal sheet in the through hole is smaller than a depth of the through hole, that is, the other surface of the metal sheet is located below the opening at the other end of the through hole to ensure that an electric-conductive sheet is not in contact with an electrode in the roll core. Similarly, the metal sheet in the blind hole blocks the electric-conductive sheet and the electrode in the roll core by using an insulating layer at a bottom of the blind hole.

Specifically, the metal sheet is immovably arranged in the through hole, the surface of the metal sheet is flush with or slightly protruding from the opening of the blind hole or the through hole. Based on the above structure, a thickness of the insulating sheet can be controlled to tend to be smaller, and a length of the roll core is controlled to tend to be larger when manufacturing a certain type of cylindrical battery, which can help to improve the battery performance. A bottom of the tab is clamped by the metal sheet, which is easier to be laser welded, and the welding tension is greater, and the risk of false welding is reduced. The ways of reduction of an impedance of a battery core and an external laser welding can avoid welding slag generated by internal welding, prevent battery short circuit, and improve safety performance. In addition, the external welding can realize continuous monitoring during the engineering manufacturing, which can be conducive to the inspection of defective products during the production process and improve the yield rate of the shipped batteries.

The metal sheet is located in a middle portion of the insulating sheet body, that is, a position tending to the center. In some embodiments, the metal sheet is concentric with the insulating sheet body, and a contact area between the electrode and the metal sheet toppedly connected by a center rod can be controlled to tend to be larger.

The metal sheet covers and is arranged on the blind hole or the hole at the end of the through hole; the metal sheet may cover a part of the opening or all of the opening. In some embodiments, the metal sheet is in a shape of a flat sheet, and an edge of the metal sheet is correspondingly located in an outer edge of the insulating sheet body.

The edge of the metal sheet is located between the tab through hole or the tab notch and the center of the insulating sheet body. Based on the same thickness of the metal sheet and the insulating sheet body, compared with the insulating sheet of the cylindrical battery in which the metal sheet and the insulating sheet body are planarly combined and the edges are flush, the own weight of the battery is reduced, and the thickness of the insulating sheet is reduced, which can help to improve the performance of the battery. Specifically, a diameter of the metal sheet is 4 mm, the thickness of the insulating sheet is 0.5 mm, and the thickness of the metal sheet is 0.2 mm to 0.3 mm.

Example 1

As shown in FIG. 1, in Example 1, the insulating sheet of a cylindrical battery includes the insulating sheet body 1; the tab through hole 2, which is eccentric, is formed in the insulating sheet body 1; the through hole 3, which is in a shape of cylinder, is arranged at a non-concentric position in the middle portion of the insulating sheet body 1; the metal sheet 4, which is in a shape of circle sheet, is fixedly arranged at the end of the through hole 3. The surface of the metal sheet 4 slightly protrudes from the opening of the through hole 3, and the other surface of the metal sheet 4 is recessed in the opening at the other end of the through hole 3.

Example 2

Figure 2:
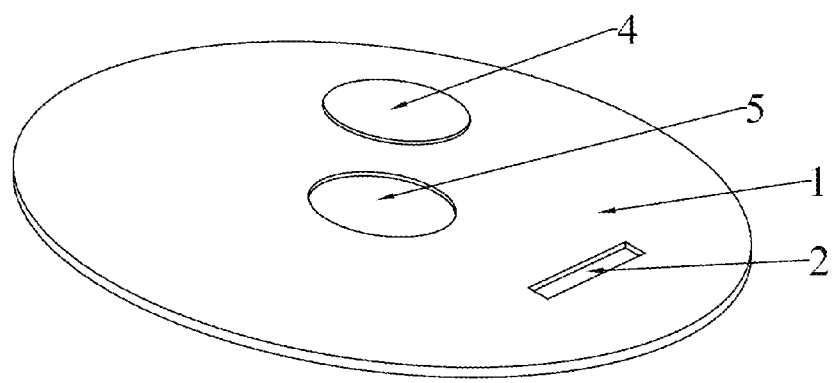
FIG. 2 shows a perspective structural schematic view in Example 2.
Figure 3:
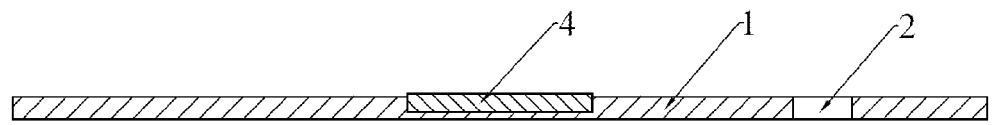
FIG. 3 shows a structural schematic view of an insulating sheet of a cylindrical battery in Example 2.

As shown in FIGS. 2-3, Example 2 is based on Example 1. The difference is that, a surface of the insulating sheet body 1 is provided with the blind hole 5 which is concentric, the metal sheet 4 is fixedly arranged in the blind hole 5, and the surface of the metal sheet 4 slightly protrudes from the opening of the blind hole 5.

Example 3

Figure 4:
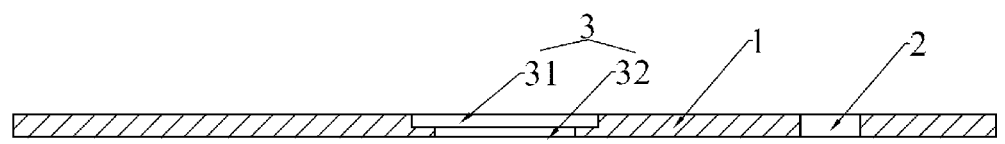
FIG. 4 shows a structural schematic view of an insulating sheet body in Example 3.
Figure 5:
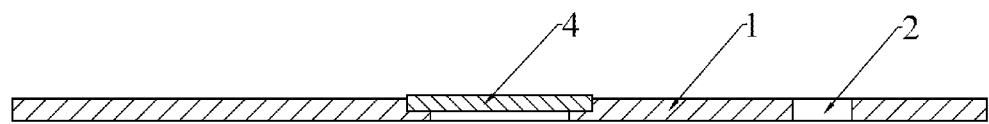
FIG. 5 shows a structural schematic view of an insulating sheet of a cylindrical battery in Example 3.

As shown in FIGS. 4-5, Example 3 is based on Example 1. The difference is that, the through hole 3 provided in the insulating sheet body 1 is the stepped through hole, the stepped through hole is in a two-segment type, including a large aperture segment 31 and a small aperture segment 32, the metal sheet 4 is fixedly arranged in the large aperture segment 31; similarly, the surface of the metal sheet 4 slightly protrudes from the opening corresponding to the large aperture segment 31.

When the tab 7 passes through the insulating sheet of the cylindrical battery, the tab 7 is bent, and the assembling body of the roll core and the insulating sheet is assembled into the battery shell, if the insulating sheet of the cylindrical battery is horizontal or a swing angle is not enough to make the metal sheet 4 out of the opening, the solution in which the insulating sheet body 1 and the metal sheet 4 are separated can also meet the assembly requirements.

Example 4

Figure 6:
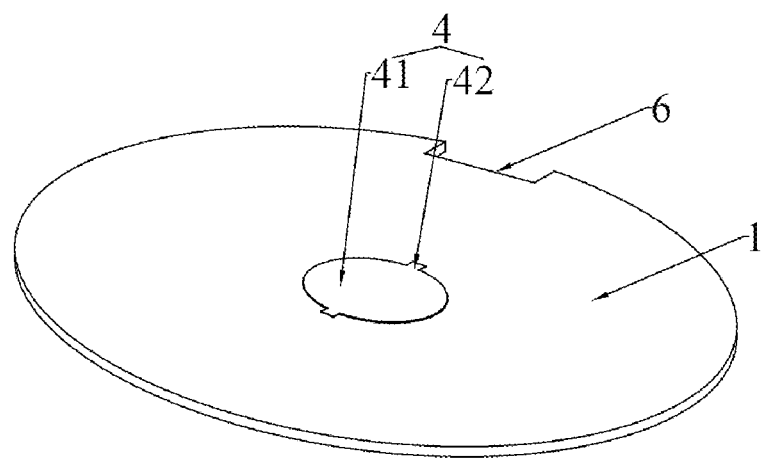
FIG. 6 shows a perspective structural schematic view in Example 4.
Figure 7:
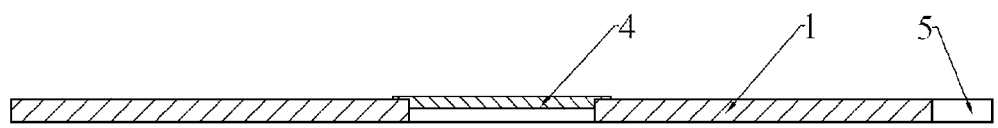
FIG. 7 shows a structural schematic view of an insulating sheet of a cylindrical battery in Example 4.

As shown in FIGS. 6-7, Example 4 is based on Example 1. The difference is that, the metal sheet 4 includes an embedded portion 41 and a convex tab 42 arranged at an edge of a center portion. The embedded portion 41 is arranged in the through hole 3. The convex tab 42 is attached or connected to the surface of the insulating sheet body 1 at an outer edge of the opening of the through hole 3. The tab notch 6 is arranged on an edge of the insulating sheet body 1.

The number of the convex tab 42 is more than one, and the convex tab 42 can be replaced by a convex ring or a convex arc. In the case of the metal sheet 4 including two or more convex tabs 42 or convex rings, if the insulating sheet of the cylindrical battery is horizontal or the swing angle is not enough to make the metal sheet 4 out of the opening, the solution in which the insulating sheet body 1 and the metal sheet 4 are separated can also meet the assembly requirements.

The surface of the metal sheet 4 of the Examples 1-4 all protrude from the surface of the insulating sheet body 1, and this structure allows the metal sheets 4 and the tabs 7 to be fully toppedly connected with each other. As an alternative solution, in Examples 1-4, a solution in which the surface of the metal sheet 4 and the surface of the insulating sheet body 1 are flush with each other can also meet the requirements for topping and connecting.

Figure 8:
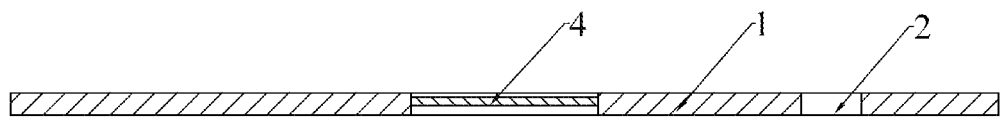
FIG. 8 shows a structural schematic view of an insulating sheet of a cylindrical battery in Example 5.

As shown in FIG. 8, Example 5 is based on Example 1. The difference is that, the diameter of the metal sheet 4 is slightly smaller than a diameter of a bottom face of the through hole 3, that is, the metal sheet 4 can be clamped and connected in the through hole 3, and the thickness of the metal sheet 4 is smaller than the thickness of the insulating sheet body 1.

Example 6

Figure 9:
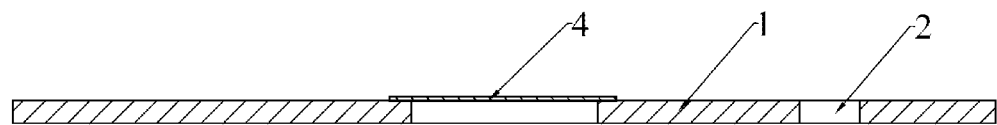
FIG. 9 shows a structural schematic view of an insulating sheet of a cylindrical battery in Example 6.

As shown in FIG. 9, Example 6 is based on Example 5. The difference is that, the metal sheet 4 covers on the opening of one end of the through hole and is connected by an insulating glue, and the diameter of the metal sheet 4 is slightly larger than the diameter of the opening of the through hole 3 covered by the metal sheet 4.

The structures of the tab through hole 2 or the tab notch 6 used to be passed and arranged by the tab 7 in Examples 1 to 6 and the metal sheet can be combined in any way.

In Examples 1-6, the insulating sheet of the cylindrical battery participating in the assembly process of the roll core 8 and the battery shell 9 includes the following steps:

S1, passing and arranging the tab 7 of the roll core 8 through the tab through hole 2 of the insulating sheet of the cylindrical battery until a free end of the tab 7 protruding from the surface of the insulating sheet of the cylindrical battery with the metal sheet 4;

S2: bending a tab segment protruding from the tab through hole 2 or the tab notch 6 until the bent tab segment is adjacent to or attached to the metal sheet 4 to obtain an assembling body of the roll core 8 and the insulating sheet of the cylindrical battery;

S3: facing the insulating sheet of the cylindrical battery toward an end face of the battery shell 9, and assembling the assembling body into the battery shell 9;

S4: inserting the center rod 10 into a center hole of the roll core 8, in which the center rod 10 is toppedly connected to an end face of the battery shell 9, the bent tab segment and the metal sheet 4; and S5: performing a laser welding at an outside of a middle portion of an end face of the battery shell 9 to connect the end face of the battery shell 9, the bent tab segment and the metal sheet 4.

Figure 10:
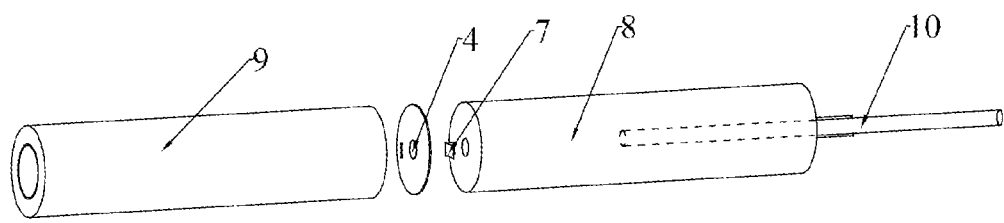
FIG. 10 shows a structural schematic view of an assembling structure of a battery shell, an insulating sheet of a cylindrical battery and a roll core.

A schematic view of an assembling structure of the battery shell 9, the insulating sheet of the cylindrical battery and the roll core 8 is shown in FIG. 10. The metal sheet 4 is fixedly connected to the insulating sheet body. Under the action of the center rod 10, the insulating sheet of the cylindrical battery moves so that the metal sheet 4, the tab 7 and an inner surface of the end face of the battery shell 9 are toppedly connected with one another.

The metal sheet 4 and the insulating sheet body are separated or movably connected with each other for a relative displacement. Under the action of the center rod 10, the metal sheet 4 can move so that the metal sheet 4, the tab 7 and the inner surface of the end face of the battery shell 9 are toppedly connected with one another.

Example 7

Figure 11:
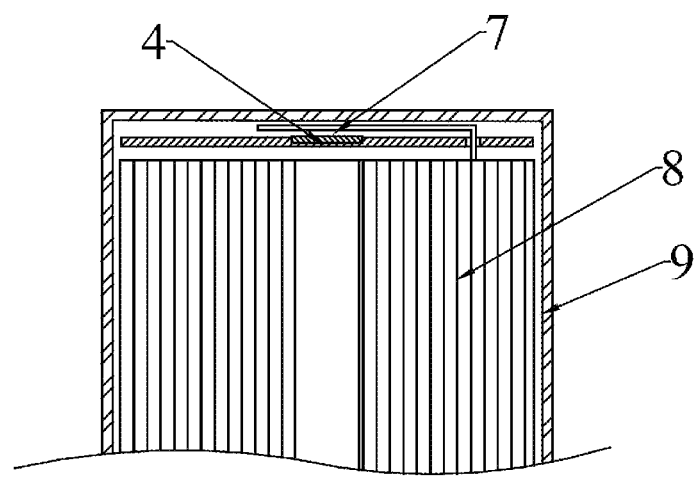
FIG. 11 shows a structural schematic view of a cylindrical battery.

As shown in FIG. 11, in Example 7, the cylindrical battery includes the battery shell and the roll core, and further includes the insulating sheet of the cylindrical battery in Example 2; the end face of the battery shell 9, the tab 7 of the roll core 8 and the metal sheet 4 of the insulating sheet of the cylindrical battery are welded and connected with one another.

The insulating sheet in the cylindrical battery can be replaced by any one of Examples 1 and 3-6.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A cylindrical battery, comprising a battery shell and a roll core with a tab, and further comprising an insulating sheet of the cylindrical battery, the insulating sheet of the cylindrical battery comprising an insulating sheet body, wherein a tab through hole or a tab notch is formed in the insulating sheet body, the tab through hole or the tab notch is arranged to be eccentric; the insulating sheet of the cylindrical battery further comprises a blind hole or a through hole formed in a middle portion of the insulating sheet body, and further comprises a metal sheet; the metal sheet covers on an opening at an end of the blind hole or the through hole and/or is arranged in the blind hole or the through hole;

a surface of the metal sheet protrudes or is flush with the opening of the blind hole or the through hole, and a thickness of the metal sheet in the through hole is smaller than a depth of the through hole; or a thickness of the metal sheet movably arranged in the through hole is smaller than a thickness of the insulating sheet body, a center rod is inserted into a center hole of the roll core, in which a top face of the center rod is connected to an end face of the battery shell, a bent tab segment and the metal sheet; an edge of the metal sheet is located between the tab through hole or the tab notch and a center of the insulating sheet body; the end face of the battery shell, the tab of the roll core and the metal sheet of the insulating sheet of the cylindrical battery are connected by welding, wherein the through hole is a stepped through hole, the stepped through hole comprises a large aperture segment and a small aperture segment, and the metal sheet is arranged in the large aperture segment.

2. The cylindrical battery according to claim 1, wherein the metal sheet and the insulating sheet body are arranged concentrically.

3. The cylindrical battery according to claim 1, wherein the metal sheet is fixedly connected to the insulating sheet body.

\* \* \* \* \*